United States Patent
Jayaraman et al.

(10) Patent No.: US 10,380,372 B2
(45) Date of Patent: Aug. 13, 2019

(54) METHODS AND SYSTEMS FOR PROVIDING SECURED ACCESS TO BIG DATA

(71) Applicant: Wipro Limited, Bangalore (IN)

(72) Inventors: Venkata Subramanian Jayaraman, Chennai (IN); Sumithra Sundaresan, Chennai (IN)

(73) Assignee: Wipro Limited, Bangalore (IN)

( * ) Notice: Subject to any disclaimer, the term of this patent is extended or adjusted under 35 U.S.C. 154(b) by 167 days.

(21) Appl. No.: 15/471,907

(22) Filed: Mar. 28, 2017

(65) Prior Publication Data
US 2018/0285589 A1    Oct. 4, 2018

(51) Int. Cl.
*G06F 21/00* (2013.01)
*G06F 21/62* (2013.01)
*G06F 21/32* (2013.01)
*H04L 29/06* (2006.01)

(52) U.S. Cl.
CPC .......... *G06F 21/6227* (2013.01); *G06F 21/32* (2013.01); *H04L 63/0861* (2013.01); *H04L 63/102* (2013.01); *H04L 2209/04* (2013.01)

(58) Field of Classification Search
None
See application file for complete search history.

(56) References Cited

U.S. PATENT DOCUMENTS 9,509,688 B1 *  11/2016  Magi Shaashua .. H04L 63/0861
2016/0210427 A1 *  7/2016  Mynhier ................. G06F 19/00

OTHER PUBLICATIONS

Thakkar, D., "Leveraging Biometrics to Secure Big Data", https://www.bayometric.com/leveraging-biometrics-secure-big-data/, date: (from source code) Dec. 28, 2016 (Year: 2016).*
Thakkar, D., "Leveraging Biometrics to Secure Big Data", https://www.bayometric.com/leveraging-biometrics-secure-big-data/.

* cited by examiner

*Primary Examiner* — Andrew J Steinle
(74) *Attorney, Agent, or Firm* — Pepper Hamilton LLP

(57) ABSTRACT

In one embodiment, a method for providing access to big data is disclosed. The method includes receiving biometric data of a user to provide access to columns of a table storing the big data, wherein one or more columns of the table are masked based on one or more data parameters and authenticating the user by comparing the biometric data of the user with pre-stored biometric data, wherein the pre-stored biometric data is retrieved from a biometric database. Further, the method includes providing upon the authentication, selective access to each column of the table based on a pre-defined user privilege for each column.

17 Claims, 4 Drawing Sheets

METHODS AND SYSTEMS FOR PROVIDING SECURED ACCESS TO BIG DATA

TECHNICAL FIELD

This disclosure relates generally to secured data access, and more particularly to methods and systems for providing secured access to big data.

BACKGROUND

Today, big data is leveraged from various data sources in order to conduct business in enterprises. Unlike traditional database, security of big data involves a lot of challenges. The traditional methods for providing secured access to data cannot be implemented for the big data because of huge volume of the big data.

Moreover, the existing methods of providing secured access to big data provide only one layer of data protection. If the first layer of the data protection is breached, the big data may be automatically accessible. Further, the existing methods, fail to provide security to the big data during the transfer of the big data. Owing to these challenges of the data protection, the big data is more vulnerable to security threats.

SUMMARY

In one embodiment, a method for providing access to big data is disclosed. The method includes receiving, by a data access device, biometric data of a user to provide access to columns of a table storing the big data, wherein one or more columns of the table are masked based on one or more data parameters and authenticating, by the data access device, the user by comparing the biometric data of the user with pre-stored biometric data, wherein the pre-stored biometric data is retrieved from a biometric database. Further, the method includes providing, by the data access device, upon the authentication, selective access to each column of the table based on a pre-defined user privilege for each column.

In one embodiment, a data access device for providing access to big data is disclosed. The data access device includes a processor and a memory communicatively coupled to the processor. The memory stores processor instructions, which, on execution, causes the processor to receive biometric data of a user to provide access to columns of a table storing the big data, wherein one or more columns of the table are masked based on one or more data parameters and authenticate the user by comparing the biometric data of the user with pre-stored biometric data, wherein the pre-stored biometric data is retrieved from a biometric database. The processor is further caused to provide upon the authentication, selective access to each column of the table based on a pre-defined user privilege for each column.

In one embodiment, a non-transitory computer-readable storage medium is disclosed having stored thereon, a set of computer-executable instructions for causing a computer comprising one or more processors to perform steps comprising receiving biometric data of a user to provide access to columns of a table storing the big data, wherein one or more columns of the table are masked based on one or more data parameters. The steps comprise authenticating the user by comparing the biometric data of the user with pre-stored biometric data, wherein the pre-stored biometric data is retrieved from a biometric database and providing upon the authentication, selective access to each column of the table based on a pre-defined user privilege for each column.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses systems and methods for providing secured access to big data. The systems and methods may be implemented in a variety of computing systems. The computing systems that can implement the described method(s) include, but are not limited to a server, a desktop personal computer, a notebook or a portable computer, hand-held devices, and a mainframe computer. Although the description herein is with reference to certain computing systems, the systems and methods may be implemented in other computing systems, albeit with a few variations, as will be understood by a person skilled in the art.

Working of the systems and methods for providing secured access to big data is described in conjunction with FIGS. 1-4. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
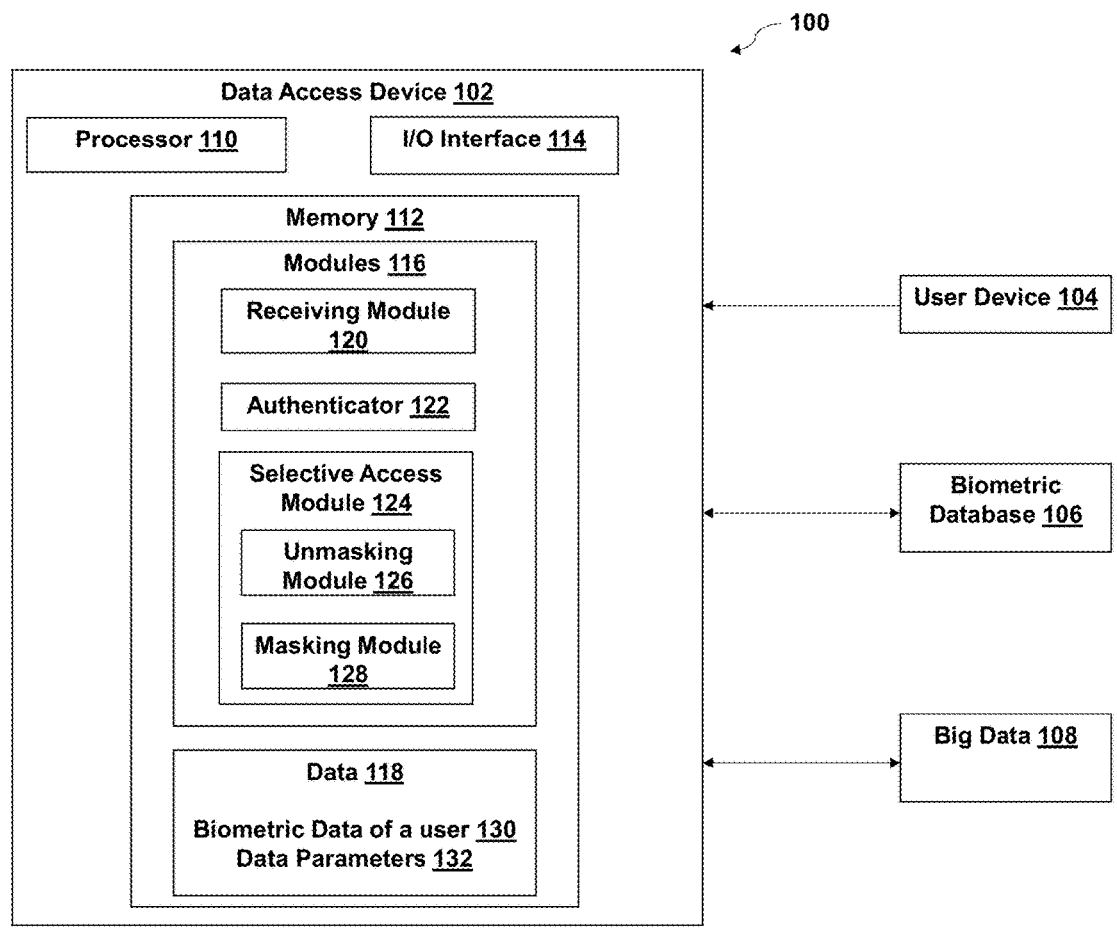
FIG. 1 illustrates an exemplary network implementation comprising a data access device for providing secured access to big data, according to some embodiments of the present disclosure.

FIG. 1 illustrates an exemplary network implementation 100 comprising a data access device 102 for providing secured access to big data, according to some embodiments of the present disclosure. As shown in the FIG. 1, the data access device 102 is communicatively coupled to a user device 104, a biometric database 106, and big data 108. The user device 104 may be, but is not limited to, a microphone, a biometric thumb reader, an iris reader, a Personal Digital Assistant (PDA), any wireless user device, a desktop, a laptop, a tablet, or a phablet. The data access device 102 may provide secured access to the big data 108 using biometric data of a user. The big data 108 may be stored in columns of plurality of tables. The biometric data of registered users may be stored in the biometric data base 106. Hereinafter, the big data 108 may be alternatively referred as big data.

The data access device 102 may be communicatively coupled to the user device 104, the biometric database 106, and the big data 108 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

As shown in the FIG. 1, the data access device 102 comprises a processor 110, the memory 112 coupled to the processor 110, and input/output (I/O) interface(s) 114. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions stored in the memory 112. The memory 112 can include any non-transitory computer-readable medium known in the art including, for example, volatile memory (e.g., RAM), and/or non-volatile memory (e.g., EPROM, flash memory, etc.).

The I/O interface(s) 114 may include a variety of software and hardware interfaces, for example, a web interface, a graphical user interface, etc., allowing the data access device 102 to interact with the user device 104. Further, the I/O interface(s) 114 may enable the data access device 102 to communicate with other computing devices. The I/O interface(s) 114 can facilitate multiple communications within a wide variety of networks and protocol types, including wired networks, for example LAN, cable, etc., and wireless networks such as WLAN, cellular, or satellite. The I/O interface(s) 114 may include one or more ports for connecting a number of devices to each other or to another server.

In one implementation, the memory 112 includes modules 116 and data 118. In one example, the modules 116, amongst other things, include routines, programs, objects, components, and data structures, which perform particular tasks or implement particular abstract data types. The modules 116 may also be implemented as, signal processor(s), state machine(s), logic circuitries, and/or any other device or component that manipulate signals based on operational instructions. Further, the modules 116 can be implemented by one or more hardware components, by computer-readable instructions executed by a processing unit, or by a combination thereof.

In one implementation, the data 118 serves, amongst other things, as a repository for storing data fetched, processed, received and generated by one or more of the modules 116. The data 118 may include biometric data of a user 130 and data parameters 132. The biometric data of the user 130 includes, but is not limited to, fingerprint of the user, iris of the user, or voice of the user. The data parameters 132 includes, but is not limited to, data frequency, data source, data type, and content format. Hereinafter, the data parameters 132 may be alternatively referred as data parameters or one or more data parameters.

In one embodiment, the data 118 may be stored in the memory 112 in the form of various data structures. Additionally, the aforementioned data can be organized using data models, such as relational or hierarchical data models. In an example, the data 118 may also comprise other data used to store data, including temporary data and temporary files, generated by the modules 116 for performing the various functions of the data access device 102.

In one implementation, the modules 116 further include a receiving module 120, an authenticator 122, and a selective access module 124. The selective access module 124 includes an unmasking module 126 and a masking module 128. In an example, the modules 116 may also comprise other modules. The other modules may perform various miscellaneous functionalities of the data access device 102. It will be appreciated that such aforementioned modules may be represented as a single module or a combination of different modules.

In order to provide secured access to big data, the receiving module 120 may receive biometric data of a user. The biometric data of the user may include, but is not limited to, fingerprint of the user, iris of the user, or voice of the user. The user may provide the biometric data as an input to the data access device 102 through the user device 104. The biometric data of the user may be stored in the memory 112 of the data access device 102 for further processing. Further, the biometric data of the user may be used to provide access to columns of a table storing the big data. In one embodiment, the receiving of the biometric data of the user may be considered as a request for accessing columns of the table storing the big data.

Before receiving the request for accessing the columns of the table, the masking module 128 may mask one or more columns of the table storing the big data. In one embodiment, the one or more columns may be masked immediately after the big data is stored in the columns of the table. Alternatively, the one or more columns may be masked when the big data is being written into the columns of the table.

In one embodiment, the masking module 128 may mask the one or more columns of the table based on the data parameters. The data parameters may include, but is not limited to, data frequency, data source, data type, and content format. The data frequency of the big data may be defined by on-demand data feed, continuous data feed, real time data feed, and time series data. The on-demand data feed may be human generated. In an example, the on-demand data feed may be weather forecast. The on-demand data feed may be generated when a software application requires data.

The continuous data feed may be generated on a daily basis. In an example, the continuous data feed may be stock data associated with retail stores which is required to be updated on a daily basis. The real time data feed may be generated on occurrence of an event in a software application. The real time data feed may be stored as big data in real time. For example, the real time data feed may be real time data generated from social media websites such as Facebook. The real time data feed may be generated when a user creates a check in on his profile. The creation of the check in may be considered as an event. The real time data generated from the creation of check in may be location of check in, time of the check in, and name of the user. This real time data may be stored dynamically as big data.

Apart from the on-demand data feed, continuous data feed, and real time data feed, the data frequency of the big data may also be defined by time series data. In an example, the time series data feed may be sales data of an enterprise. The time series data may be stored as big data at regular time intervals. The time intervals may be once a day, weekly, or monthly. The on-demand data feed, the continuous data feed, the real time data feed, and the time series data may be stored as the big data in columns of a table.

In one embodiment, the one or more columns of the table may be masked based on the data frequency of the big data and the data source. As shown in the table below, the columns of the table may be masked based on type of data frequency and the type of data source.

TABLE 1

| Data Source | Data frequency | Columns to be masked |
| --- | --- | --- |
| Human Generated | On-Demand Data Feed | All the columns |
| Machine Generated | Continuous Data Feed | Selective Columns |
| Social media | Real Time Data Feed | Selective Columns |
| Transaction data | Time Series Data Feed | All the columns |

As shown in the Table 1, the real time data feed may be generated from social media websites. The real time data feed stored in the columns of the table may be masked selectively. For example, if a user creates a check in, the name of the user may not be masked, however, the location of check in and the time of check in may be masked. Similarly, if the continuous data feed is machine generated, the columns of the table may be masked selectively. On the other hand, if the on-demand data feed is human generated, all the columns of the table may be masked as the risk of breach associated with the on-demand data feed is high. Similarly, if the time series data feed is generated from transaction data, all the columns of the table may be masked as the risk of breach associated with the time series data feed is high.

Apart from the data frequency and the data source, the one or more columns of the table may be masked based on the data type. The data type may include, but is not limited to, metadata, master data, historical data, and transaction data. The transaction data may include data describing an event. In an example, the transaction data may include purchases made by a user. The transaction data may be characterized by a time dimension or a numerical value and may refer to one or more objects. The one or more objects may include name of a user, purchases made by the user, and store details. In one embodiment, the historical data may be digital information outlining activity, conditions, and trends in an enterprise's past. The historical data may be archived, and may be stored in non-volatile or secondary storage. The historical data may be used for predicting future performance of an enterprise. The historical data may also be used for market analysis to predict the future performance of the enterprise.

The master data may represent pre-defined business objects of an enterprise. In an example, the pre-defined business objects may include store number, telephone number, store address which are constant and are predefined. The master data may also be shared across the enterprise. The master data may include static reference data, transaction data, unstructured data, analytical data, hierarchical data, and metadata. The master data may be significant for the Information Technology (IT) discipline of Master Data Management (MDM). The metadata provides more information about other types of data. In an example, the type of metadata may be descriptive metadata, structural metadata, and administrative metadata. Further, as shown in the table below, the columns of the table may be masked based on the data type.

TABLE 2

| Data types | Masking functions for the columns | Reasons | Before Masking | Example after masking |
| --- | --- | --- | --- | --- |
| Metadata | Default ( ) | Higher security needs | SMITH | FFECDEF |
| Master data | Partial (a, 'x', b) | Medium security | STORE, 100 | STORE, 975 |
| Historical Data | Ramdom (a, b) | Lower security | 6372 | 6370 |
| Transaction Data | Default ( ) | Higher security needs | 500-50-5050 | 972-634-3324 |

As shown in the table 2, if the data type is metadata and transaction data, a default masking function may be implemented for masking the columns of the table. In an example, a default masking function may modify all the characters of the data using a standard method. As shown in the Table 2, if the data is "SMITH" and "500-50-5050", after masking "SMITH" may be converted to "FFECDEF" and "500-50-5050" may be converted to "972-634-3324". If the data type is master data, a partial masking function may be implemented. The partial masking function may mask only partial characters of the data. In an example, if the data is "STORE, 100", the partial masking function may mask only "100" to provide masked column data as "STORE, 975". Similarly, if the data type is historical data, a random masking function may be implemented to mask the columns of the table. In an example, the random masking function may randomly choose characters of the data for masking. In an example, if the data is "6372", the random masking function may mask a character 2 to provide the masked data as "6370".

Apart from the data frequency, the data source, and the data type, the columns of the table storing the big data may be masked based on the content format. The content format may include, but is not limited to, structured data, unstructured data, and semi structured data. As shown in the table below, the columns of the table may be masked based on the content format.

TABLE 3

| Content format | Columns to be masked |
| --- | --- |
| Structured data | All the columns |
| Unstructured data | All the columns |
| Semi structured data | Selective columns |

As shown in the Table 3, if the content format is structured data or unstructured data, all the columns of the table may be masked. On the other hand, if the content format is semi structured data, columns of the table may be masked selectively.

The masking of the columns of the table after storing the big data provides a first level of security to the big data. Additional levels of security may be introduced to protect the big data after a user requests access to the columns of the table. The second level of security may be introduced by authenticating a user requesting access to the columns of the table storing the big data. Upon receiving the biometric data of the user by the receiving module 120, the authenticator 122 may authenticate the user by comparing the biometric data of the user with pre-stored biometric data. The pre-stored biometric data may be retrieved from a biometric database 106. The biometric database 106 may store biometric data of user as shown in the below table.

TABLE 4

| User | Iris | Fingerprint | Voice |
|---|---|---|---|
| User A | 1.jpg | 11.jpg | 111.mav |
| User B | 2.jpg | 22.jpg | 222.mav |
| User C | <empty> | <empty> | <empty> |

As shown in the Table 4, the biometric data of user A and user B is pre-stored in the biometric database 106. In contrast, the biometric data of the user C is unavailable in the biometric database 106. In one scenario, if the user A requests access to the columns of the table, the authenticator 122 may compare the biometric data of the user A with the pre-stored biometric data, as shown in the Table 4. If the biometric data of the user A is a fingerprint, the fingerprint of the user A may be compared with image 11.jpg. If the fingerprint of the user A matches with the image 11.jpg, the user A may be authenticated to access the columns of the table. Upon a successful match of the fingerprint with the image 11.jpg, the authentication may be recorded as a successful authentication. The authenticator 122 may record each successful authentication of the user to access the columns of the table.

In another scenario, if the user C requests access to the columns of the table, the authenticator 122 may compare the biometric data of the user C with the pre-stored biometric data, as shown in the Table 4. As the biometric data of the user C is not present in the biometric database 106, the user C is not authenticated to access the columns of the table. The authenticator 122 may record this attempt of the user C to access the columns of the table as an unsuccessful authentication, as the biometric data of user C is unavailable in the biometric database 106. The authenticator 122 may record each unsuccessful authentication of a user to access the columns of the table when the biometric data of the user is unavailable in the biometric database 106. Further, the authentication of the user by comparing the biometric data of the user with pre-stored biometric data is explained in detail in conjunction with the FIG. 3.

Upon authentication of the user by the authenticator 122, the selective access module 124 may provide the user a selective access to each column of the table based on a pre-defined user privilege for each column. The selective access to each column based on the pre-defined user privilege for each column provides a third level of security for protecting the big data. In one embodiment, the unmasking module 126 may provide selective access to the columns of the table by unmasking a masked column of the table if the pre-defined user privilege for the masked column allows the user access to the masked column.

In one embodiment, the masking module 128 may provide selective access to the columns of the table by maintaining mask of a masked column if the pre-defined user privilege for the masked column rejects the user access to the masked column.

In one example, the pre-defined user privilege to access the columns of the table may be as shown in below table.

TABLE 5

| User | Column 1 | Column 2 | Column 3 | Column 4 | Column 5 | Column 6 |
|---|---|---|---|---|---|---|
| User A | Unmask | Unmask | Unmask | Mask | Mask | Mask |
| User B | Unmask | Unmask | Unmask | Unmask | Unmask | Unmask |
| User C | Mask | Mask | Mask | Mask | Mask | mask |

As shown in the Table 5, the pre-defined user privilege for the user A allows the user A to access column 1, column 2, and column 3. The pre-defined user privilege for the user A rejects the user A access to column 4, column 5, and column 6. In one example, let us consider that user A requests to access the big data which is stored in the column 2 and the column 4. Upon authentication of the user A by the authenticator 122, the selective access module 124 may refer to the Table 5 to provide selective access to user A to column 2 and column 4. In order to provide the selective access, the unmasking module 126 may unmask the column 2 as the pre-defined user privilege for the column 2 allows the user A access to the column 2. In contrast, the masking module 128 may maintain the mask of the column 4 as the pre-defined user privilege for the column 4 rejects the user A access to the column 4.

In another example, let us consider that user B requests access to the big data which is stored in column 1, column 2, column 3, column 4, column 5, and column 6. Upon authentication of the user B by the authenticator 122, the selective access module 124 may refer to the Table 5 to provide selective access to user B to column 1, column 2, column 3, column 4, column 5, and column 6. In order to provide the selective access, the unmasking module 126 may unmask the column 1, column 2, column 3, column 4, column 5, and column 6 as the pre-defined user privilege for all the columns i.e. column 1, column 2, column 3, column 4, column 5, and column 6 allow the user B access to the columns.

In another example, let us consider that the user C requests access to the big data which is stored in column 1 and column 2. As the biometric data of the user C is unavailable in the biometric database (referring to the Table 4), the authenticator 122 may not authenticate the user C to selectively access the columns of the table. The request of the user C may not be processed further for providing selective access. Further, the authenticator 122 may record the request to access the big data as an unsuccessful authentication. Thus, the data access device 102 may provide multiple levels of security while accessing the big data. The multiple levels of security may include, selective or complete masking of the big data based on the data parameters when the big data is stored in columns of a table, authentication of the user before accessing the big data, and selective access to the columns of the table based on pre-defined user privilege.

Figure 2:
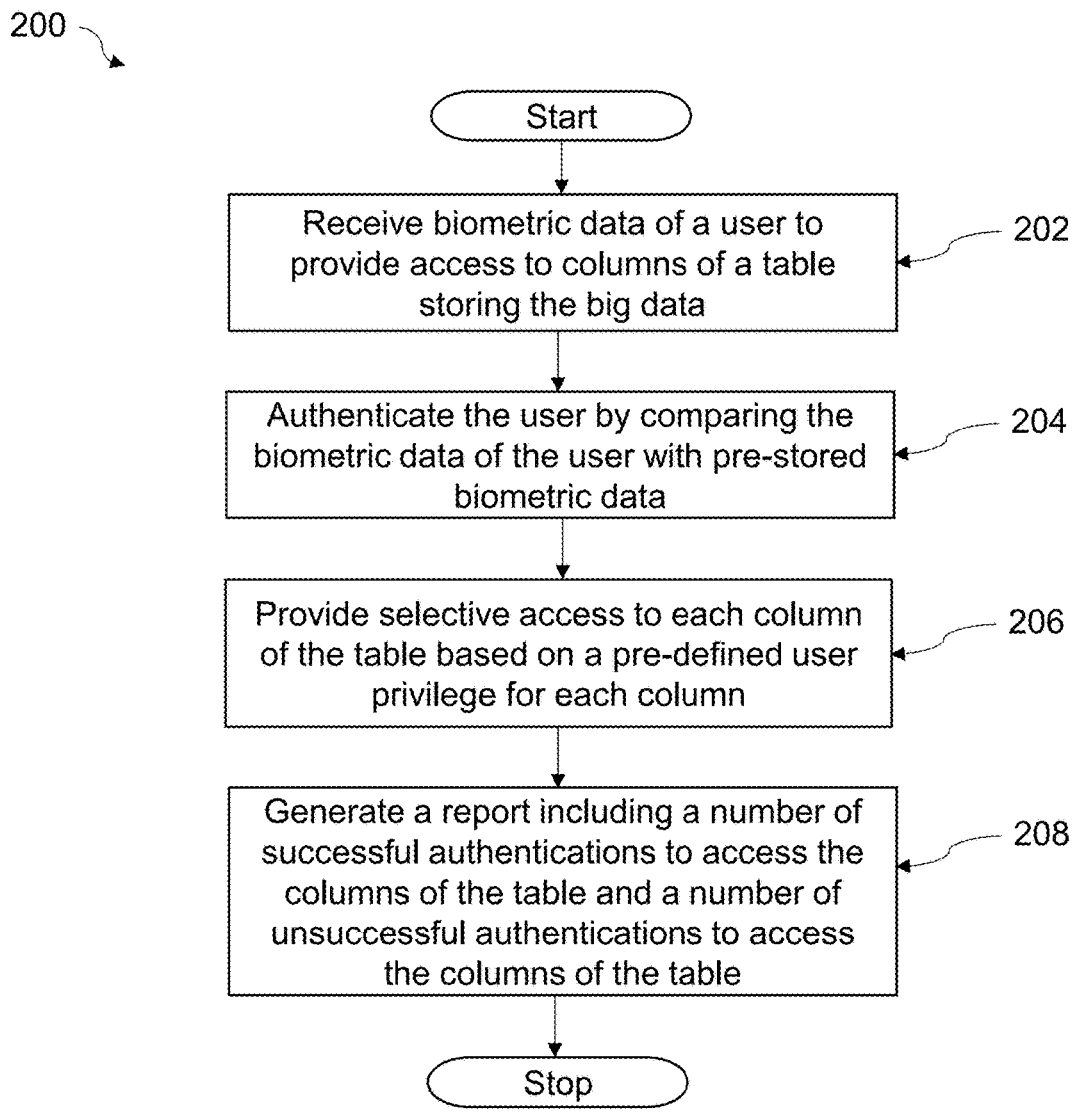
FIG. 2 is a flow diagram illustrating a method for providing secured access to big data, in accordance with some embodiments of the present disclosure

FIG. 2 is a flow diagram illustrating a method 200 for providing secured access to big data, in accordance with some embodiments of the present disclosure.

The method 200 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to the FIG. 2, at block 202, biometric data of a user may be received to provide access to columns of a table storing the big data. The biometric data of the user may include, but is not limited to, fingerprint of the user, iris of the user, or voice of the user. The user may provide the biometric data as an input to the data access device 102 through the user device 104. The biometric data of the user may be stored in the memory 112 of the data access device 102 for further processing. Further, the biometric data of the user may be used to provide access to columns of a table storing the big data. The receiving of the biometric data of the user is explained in detail in conjunction with the FIG. 1.

At block 204, the user may be authenticated by comparing the biometric data of the user with pre-stored biometric data. The pre-stored biometric data may be retrieved from a biometric database 106. If the biometric data of the user is a fingerprint, the fingerprint may be matched with a pre-stored fingerprint. If the fingerprint matches with the pre-stored fingerprint, the user may be authenticated to access the columns of the table. In one embodiment, the user may be authenticated by the authenticator 122. The authenticating of the user is explained in detail in conjunction with the FIG. 1

At block 206, selective access may be provided to each column of the table based on a pre-defined user privilege for each column. In one embodiment, providing selective access to each column of the table includes unmasking a masked column of the table if the pre-defined user privilege for the masked column allows the user access to the masked column. In one embodiment, providing selective access to each column of the table includes maintaining mask of a masked column if the pre-defined user privilege for the masked column rejects the user access to the masked column. In one embodiment, the selective access may be provided to each column of the table by the selective access module 124. The providing of selective access to each column of the table based on the pre-defined user privilege for each column is explained in detail in conjunction with the FIG. 1

At block 208, a report may be generated including a number of successful authentications to access the columns of the table and a number of unsuccessful authentications to access the columns of the table. Upon authentication of the user, each successful authentication may be recorded. Similarly, each unsuccessful authentication of the user to access the columns of the table may be recorded. The unsuccessful authentication may occur when the biometric data of the user is unavailable in the biometric database 106.

In one example, the report including the number of successful authentications and the number of unsuccessful authentications may be as shown below.

TABLE 6

|        | Authentication | Number | Table Access | Number |
|--------|----------------|--------|--------------|--------|
| User A | Successful     | 50     | Successful   | 25     |
| User B | Successful     | 40     | Successful   | 33     |
| User C | Successful     | 20     | Successful   | 33     |
| User A | Unsuccessful   | 20     | Unsuccessful | 30     |
| User B | Unsuccessful   | 30     | Unsuccessful | 45     |
| User C | Unsuccessful   | 40     | Unsuccessful | 32     |
| User D | Unsuccessful   | 50     | Unsuccessful | 45     |

Figure 3:
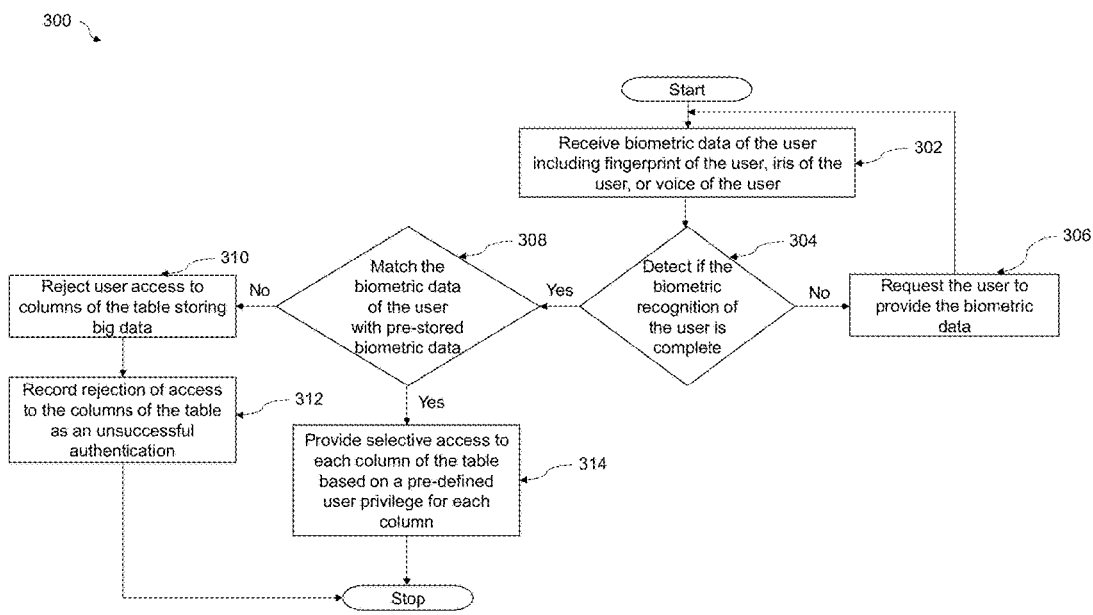
FIG. 3 is a flow diagram illustrating another method for providing secured access to big data, in accordance with some embodiments of the present disclosure.

FIG. 3 is a flow diagram illustrating another method 300 for providing secured access to big data, in accordance with some embodiments of the present disclosure.

The method 300 may be described in the general context of computer executable instructions. Generally, computer executable instructions can include routines, programs, objects, components, data structures, procedures, modules, and functions, which perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternative methods. Additionally, individual blocks may be deleted from the method 300 without departing from the spirit and scope of the subject matter described herein. Furthermore, the method 300 can be implemented in any suitable hardware, software, firmware, or combination thereof.

With reference to the FIG. 3, at block 302, biometric data of a user may be received to provide access to columns of a table storing the big data. The biometric data of the user may include, but is not limited to, fingerprint of the user, iris of the user, or voice of the user. The user may provide the biometric data as an input to the data access device 102 through the user device 104. The biometric data of the user may be stored in the memory 112 of the data access device 102 for further processing. Further, the biometric data of the user may be used to provide access to columns of a table storing the big data. The receiving of the biometric data of the user is explained in detail in conjunction with the FIG. 1.

At block 304, completion of biometric recognition of the user may be detected. If the biometric recognition of the user is incomplete, then at block 306, the user may be requested to provide the biometric data again as an input.

At block 308, the biometric data of the user may be matched with pre-stored biometric data if the biometric recognition of the user is complete. The pre-stored biometric data may be retrieved from a biometric database 106. If the biometric data of the user is a fingerprint, the fingerprint may be matched with a pre-stored fingerprint. In one embodiment, the biometric data of the user may be matched with the pre-stored biometric data by the authenticator 122. The matching of the biometric data of the user with the pre-stored biometric data is explained in detail in conjunction with the FIG. 1.

At block 310, the access to the columns of the table storing the big data may be rejected if the biometric data of the user does not match with the pre-stored biometric data.

At block 312, rejection of access to the columns of the table may be recorded as an unsuccessful authentication. The unsuccessful authentication may occur when the biometric data of the user is unavailable in the biometric database 106. Further, a report may be generated including a number of successful authentications to access the columns of the table and a number of unsuccessful authentications to access the columns of the table.

At block 314, selective access may be provided to each column of the table based on the pre-defined user privilege for each column if the biometric data of the user matches with the pre-stored biometric data. In one embodiment, providing selective access to each column of the table includes unmasking a masked column of the table if the pre-defined user privilege for the masked column allows the user access to the masked column. In one embodiment, providing selective access to each column of the table includes maintaining mask of a masked column if the pre-defined user privilege for the masked column rejects the user access to the masked column. In one embodiment, the selective access may be provided to each column of the table by the selective access module 124. The providing of selective access to each column of the table based on the pre-defined user privilege for each column is explained in detail in conjunction with the FIG. 1.

Computer System

Figure 4:
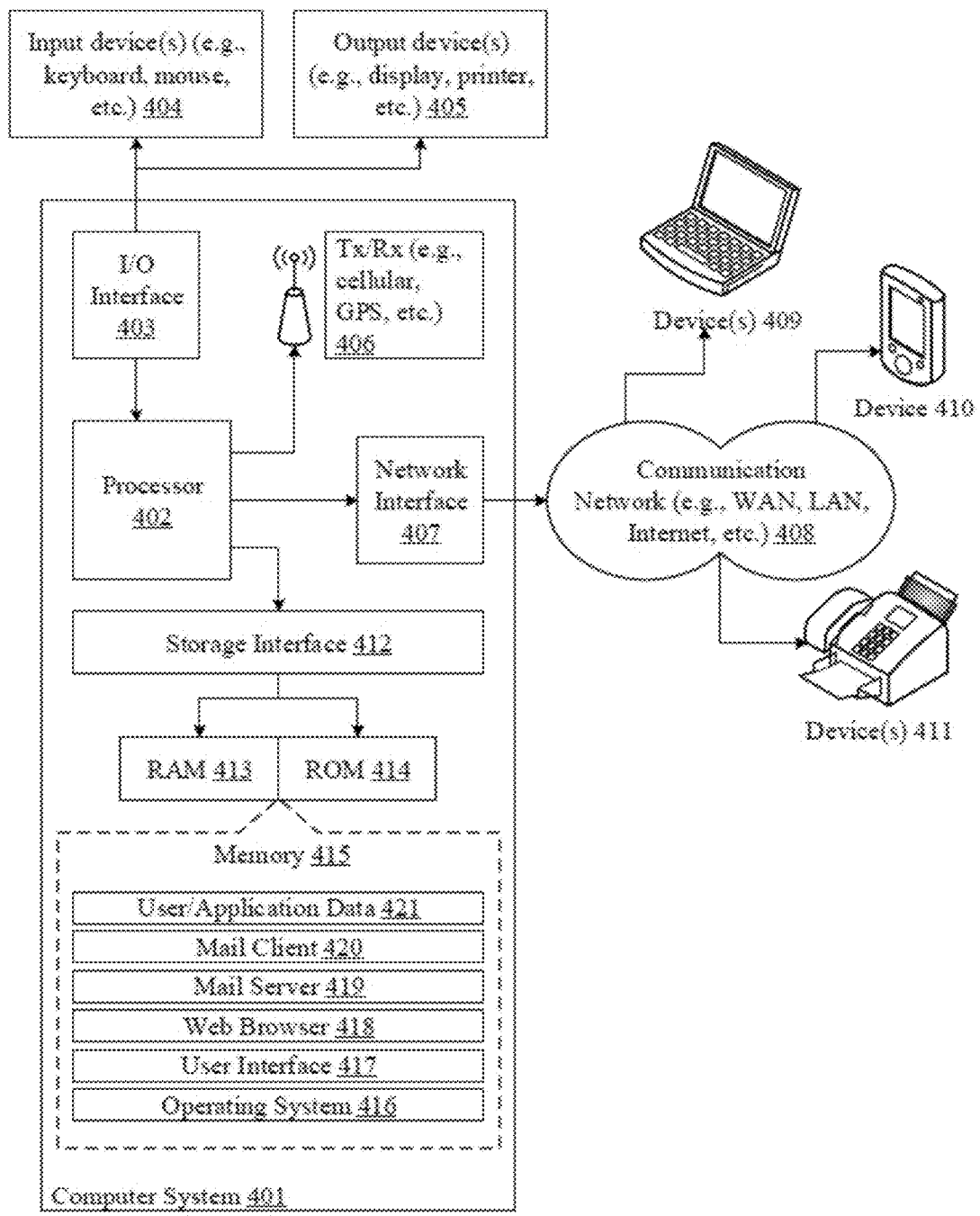
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing the receiving module 120, the authenticator 122, and the selective access module 124. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, BLUETOOTH, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, BLUETOOTH, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., APPLE iPhone, BLACKBERRY, ANDROID-based phones etc.), tablet computers, eBook readers (Amazon KINDLE, NOOK, etc.), laptop computers, notebooks, gaming consoles (MICROSOFT Xbox, NINTENDO DS, SONY PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, APPLE Macintosh OS X, Unix, Unix-like system distributions (e.g., Berkeley Software Distribution (BSD), FreeBSD, NetBSD, OpenBSD, etc.), LINUX distributions (e.g., Red Hat, Ubuntu, Kubuntu, etc.), IBM OS/2, MICROSOFT Windows (XP, Vista/7/8, etc.), APPLE iOS, GOOGLE ANDROID, BLACKBERRY OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, APPLE Macintosh operating systems' Aqua, IBM OS/2, MICROSOFT Windows (e.g., Aero, Metro, etc.), Unix X-Windows, web interface libraries (e.g., ActiveX, Java, Javascript, AJAX, HTML, ADOBE Flash, etc.), or the like.

In some embodiments, the computer system 401 may implement a web browser 418 stored program component. The web browser may be a hypertext viewing application, such as MICROSOFT Internet Explorer, GOOGLE Chrome, MOZILLA Firefox, APPLE Safari, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE Flash, JavaScript, Java, application programming interfaces (APIs), etc. In some embodiments, the computer system 401 may implement a mail server 419 stored program component. The mail server may be an Internet mail server such as MICROSOFT Exchange, or the like. The mail server may utilize facilities such as ASP, ActiveX, ANSI C++/C#, MICROSOFT .NET, CGI scripts, Java, JavaScript, PERL, PHP, Python, WebObjects, etc. The mail server may utilize communication protocols such as internet message access protocol (IMAP), messaging application programming interface (MAPI), MICROSOFT Exchange, post office protocol (POP), simple mail transfer protocol (SMTP), or the like. In some embodiments, the computer system 401 may implement a mail client 420 stored program component. The mail client may be a mail viewing application, such as APPLE Mail, MICROSOFT Entourage, MICROSOFT Outlook, MOZILLA Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using Obj ectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for providing secured access to the big data. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for providing access to big data, the method comprising:
    selective masking, by a data access device, of one or more columns of a table storing the big data based on one or more data parameters that define levels of security needed, wherein the one or more data parameters comprises data frequency, data source, data type, and content format;
    receiving, by the data access device, biometric data of a user to provide access to the masked columns of the table storing the big data;
    authenticating, by the data access device, the user by comparing the biometric data of the user with pre-stored biometric data, wherein the pre-stored biometric data is retrieved from a biometric database; and
    providing, by the data access device, upon the authentication, selective access to a masked column of the table based on a pre-defined user privilege for the masked column.

2. The method of claim 1, further comprises recording unsuccessful authentication of a user to access the columns of the table, wherein the unsuccessful authentication occurs when the biometric data of the user is unavailable in the biometric database.

3. The method of claim 2, further comprises generating a report including a number of successful authentications to access the columns of the table and a number of unsuccessful authentications to access the columns of the table.

4. The method of claim 1, wherein the biometric data comprises fingerprint of the user, iris of the user, or voice of the user.

5. The method of claim 1, wherein providing selective access to each column of the table comprises:
   unmasking, by the data access device, the masked column of the table if the pre-defined user privilege for the masked column allows the user access to the masked column; and
   providing, by the data access device, access to the unmasked column of the table.

6. The method of claim 1, wherein providing selective access to the masked column of the table comprises maintaining mask of the masked column if the pre-defined user privilege for the masked column rejects the user access to the masked column.

7. A data access device comprising:
   a processor; and
   a memory communicatively coupled to the processor, wherein the memory stores processor instructions, which, on execution, causes the processor to:
      selectively mask one or more columns of a table to store big data based on one or more data parameters that define levels of security needed, wherein the one or more data parameters comprises data frequency, data source, data type, and content format;
      receive biometric data of a user to provide access to the masked columns of the table storing the big data;
      authenticate the user by comparing the biometric data of the user with pre-stored biometric data, wherein the pre-stored biometric data is retrieved from a biometric database; and
      provide upon the authentication, selective access to a masked column of the table based on a pre-defined user privilege for the masked column.

8. The data access device of claim 7, wherein the processor is further caused to record unsuccessful authentication of a user to access the columns of the table, wherein the unsuccessful authentication occurs when the biometric data of the user is unavailable in the biometric database.

9. The data access device of claim 8, wherein the processor is further caused to generate a report including a number of successful authentications to access the big data and a number of unsuccessful authentications to access the big data.

10. The data access device of claim 7, wherein the biometric data comprises fingerprint of the user, Iris of the user, or voice of the user.

11. The data access device of claim 7, wherein providing selective access to each column of the table comprises:
   unmasking the masked column of the table if the pre-defined user privilege for the masked column allows the user access to the masked column; and
   providing access to the unmasked column of the table.

12. The data access device of claim 7, wherein providing selective access to the masked column of the table comprises maintaining mask of the masked column if the pre-defined user privilege for the masked column rejects the user access to the masked column.

13. A non-transitory computer-readable storage medium having stored thereon, a set of computer-executable instructions for causing a computer comprising one or more processors to perform steps comprising:
   selective masking of one or more columns of a table storing big data based on one or more data parameters that define levels of security needed, wherein the one or more data parameters comprises data frequency, data source, data type, and content format;
   receiving biometric data of a user to provide access to the masked columns of a table storing the big data;
   authenticating the user by comparing the biometric data of the user with pre-stored biometric data, wherein the pre-stored biometric data is retrieved from a biometric database; and
   providing upon the authentication, selective access to a masked column of the table based on a pre-defined user privilege for the masked column.

14. The non-transitory computer-readable storage medium of claim 13, wherein the steps further comprise recording unsuccessful authentication of a user to access the columns of the table, wherein the unsuccessful authentication occurs when the biometric data of the user is unavailable in the biometric database.

15. The non-transitory computer-readable storage medium of claim 14, wherein the steps further comprise generating a report including a number of successful authentications to access the columns of the table and a number of unsuccessful authentications to access the columns of the table.

16. The non-transitory computer-readable storage medium of claim 13, wherein the steps for providing selective access to the masked column of the table comprises:
   unmasking the masked column of the table if the pre-defined user privilege for the masked column allows the user access to the masked column; and
   providing access to the unmasked column of the table.

17. The non-transitory computer-readable storage medium of claim 13, wherein the steps for providing selective access to the masked column of the table comprises maintaining mask of the masked column if the pre-defined user privilege for the masked column rejects the user access to the masked column.

* * * * *